United States Patent
Sasakawa

(10) Patent No.: US 11,773,227 B2
(45) Date of Patent: Oct. 3, 2023

(54) RESIN COMPOSITION FOR PRODUCING STRETCHED SHEET, STRETCHED SHEET, AND METHOD FOR PRODUCING STRETCHED SHEET

(71) Applicant: TBM CO., Ltd., Tokyo (JP)

(72) Inventor: Gouki Sasakawa, Tokyo (JP)

(73) Assignee: TBM CO., LTD., Tokyo (JP)

( * ) Notice: Subject to any disclaimer, the term of this patent is extended or adjusted under 35 U.S.C. 154(b) by 0 days.

(21) Appl. No.: 17/915,343

(22) PCT Filed: Jan. 7, 2021

(86) PCT No.: PCT/JP2021/000391
§ 371 (c)(1),
(2) Date: Sep. 28, 2022

(87) PCT Pub. No.: WO2021/199558
PCT Pub. Date: Oct. 7, 2021

(65) Prior Publication Data
US 2023/0123225 A1 Apr. 20, 2023

(30) Foreign Application Priority Data

Apr. 3, 2020 (JP) .................................. 2020-067320

(51) Int. Cl.
| | | |
|---|---|---|
| *C08L 23/12* | (2006.01) | |
| *C08L 23/14* | (2006.01) | |
| *C08J 5/18* | (2006.01) | |
| *B29C 55/02* | (2006.01) | |
| *C08K 3/26* | (2006.01) | |
| *B29K 23/00* | (2006.01) | |

(52) U.S. Cl.
CPC ............. *C08J 5/18* (2013.01); *B29C 55/02* (2013.01); *C08K 3/26* (2013.01); *C08L 23/12* (2013.01); *C08L 23/14* (2013.01); *B29K 2023/12* (2013.01); *C08J 2323/14* (2013.01); *C08K 2003/265* (2013.01); *C08K 2201/003* (2013.01); *C08K 2201/006* (2013.01); *C08L 2201/10* (2013.01); *C08L 2205/025* (2013.01)

(58) Field of Classification Search
CPC ...... C08L 23/12; C08L 23/14; C08L 2205/02; C08L 2205/025; C08L 2201/10; C08K 2003/265
See application file for complete search history.

(56) References Cited

U.S. PATENT DOCUMENTS 11,390,732 B2 * 7/2022 Van Houcke ........... C08L 23/14

FOREIGN PATENT DOCUMENTS

| CN | 108641197 A | * 10/2018 | ............. C08L 23/14 |
|---|---|---|---|
| EP | 3739001 A1 | * 11/2020 | ............. C08L 23/06 |
| JP | 2010077297 A | 4/2010 | |
| JP | 2010150395 A | 7/2010 | |
| JP | 2015178615 A | 10/2015 | |
| JP | 201604621 A | 12/2016 | |
| JP | 2017165027 A | 9/2017 | |
| JP | 2018127620 A | 8/2018 | |
| JP | 2019007006 A | 1/2019 | |
| JP | 2019147953 A | 9/2019 | |
| JP | 6661156 B1 | 3/2020 | |
| JP | 6675700 B1 | 4/2020 | |
| WO | 2015129851 A1 | 9/2015 | |
| WO | 2018147335 A1 | 8/2018 | |
| WO | WO 2019/004206 A1 | * 1/2019 | ............. C08L 23/06 |

OTHER PUBLICATIONS

CN 1086411797 (Oct. 12, 2018); machine translation. (Year: 2018).*
International Search Report for International Application No. PCT/JP2021/000391; dated Mar. 16, 2021.
JP Notice of Reasons for Refusal for corresponding JP Application No. 2020-067320; dated Jun. 25, 2020.

* cited by examiner

*Primary Examiner* — Rip A Lee
(74) *Attorney, Agent, or Firm* — CANTOR COLBURN LLP

(57) ABSTRACT

A resin composition having a high blending proportion of an inorganic substance powder that can produce a stretched sheet having an excellent elongation property and high whiteness and opacity. A resin composition for producing a stretched sheet including: a first thermoplastic resin, a second thermoplastic resin different from the first thermoplastic resin, and an inorganic substance powder, in which a mass proportion of the first thermoplastic resin and the inorganic substance powder is 50:50 to 10:90, a content of the second thermoplastic resin is 1% by mass or more and 7% by mass or less relative to a total amount of the first thermoplastic resin and the inorganic substance powder, and the second thermoplastic resin is low stereoregular polypropylene.

8 Claims, No Drawings

RESIN COMPOSITION FOR PRODUCING STRETCHED SHEET, STRETCHED SHEET, AND METHOD FOR PRODUCING STRETCHED SHEET

CROSS REFERENCE TO RELATED APPLICATIONS

This is the U.S. national stage of application No. PCT/JP2021/000391, filed on Jan. 7, 2021. Priority under 35 U.S.C. § 119(a) and 35 U.S.C. § 365(b) is claimed from Japanese Application No. 2020-067320, filed Apr. 3, 2020, the disclosure of which is also incorporated herein by reference.

FIELD

The present invention relates to a resin composition for producing a stretched sheet, the stretched sheet, and a method for producing the stretched sheet.

BACKGROUND

Conventionally, resin compositions blended with an inorganic substance powder have been used in a wide range of applications such as materials for various molded products. For example, as the molded products obtained from such resin compositions, stretched sheets and the like having excellent strength and the like have been developed (for example, Patent Literatures 1 to 8).

CITATION LIST

Patent Literature

Patent Literature 1: Japanese Patent Application Laid-open No. 2017-165027
Patent Literature 2: Japanese Patent Application Laid-open No. 2015-178615
Patent Literature 3: WO No. 2018/147335 Pamphlet
Patent Literature 4: Japanese Patent Application Laid-open No. 2019-147953
Patent Literature 5: WO No. 2015/129851 Pamphlet
Patent Literature 6: Japanese Patent Application Laid-open No. 2018-127620
Patent Literature 7: Japanese Patent Application Laid-open No. 2019-7006
Patent Literature 8: Japanese Patent. Application Laid-open No. 2010-77297

SUMMARY

Technical Problem

The inventors of the present invention, however, have found that an increase in whiteness and opacity without impairing the mechanical properties (in particular, an elongation property) of sheets is difficult in the case where the stretched sheets are produced from resin compositions having a high blending proportion of an inorganic substance powder. Specifically, when the sheets are stretched in order to achieve the desired whiteness and opacity, there is possibility of uneven stretching, reduction, and the like in strength due to the insufficient elongation property.

The present invention has been made in view of the above situation and an object of the present invention is to provide a resin composition having a high blending proportion of an inorganic substance powder that can produce a stretched sheet having excellent elongation property and high whiteness and opacity.

Solution to Problem

As a result of intensive study for solving the above-described problem, the inventors of the present invention have found that the above problem can be solved by blending a specific amount of a polypropylene resin having specified characteristics in a resin composition having a high blending proportion of an inorganic substance powder. Specifically, the present invention provides the followings.

(1) A resin composition for producing a stretched sheet, the resin composition comprising:
  a first thermoplastic resin,
  a second thermoplastic resin different from the first thermoplastic resin, and
  an inorganic substance powder, in which a mass proportion of the first thermoplastic resin and the inorganic substance powder is 50:50 to 10:90;
  a content of the second thermoplastic resin is 1% by mass or more and 7% by mass or less relative to a total amount of the first thermoplastic resin and the inorganic substance powder; and
  the second thermoplastic resin is a polypropylene resin satisfying all of (A) to (F) below:
  (A) a weight average molecular weight (Mw) is 10,000 or more and 400,000 or less;
  (B) a molecular weight distribution (Mw/Mn) is 1.0 or more and 3.0 or less;
  (C) a tensile modulus is 1 MPa or more and 600 MPa or less;
  (D) 50% by mole or more of a monomer constituting the polypropylene resin is a propylene monomer;
  (E) constituting units of the polypropylene resin satisfy (i) and/or (ii):
    (i) a constituting unit of ethylene is comprised in more than 0% by mole and 20% by mole or less; and
    (ii) a constituting unit of 1-butene is comprised in more than 0% by mole to 30% by mole or less; and
  (F) a melting point (Tm-D) defined by a peak top observed at a highest temperature side of a melting endothermic curve obtained by using a differential scanning calorimeter (DSC), retaining a sample at −10° C. under nitrogen atmosphere for 5 minutes, and thereafter raising a temperature at 10° C./minute is 0° C. or more and 120° C. or less.

(2) The resin composition as described in (1), in which the inorganic substance powder is heavy calcium carbonate without performing surface treatment.

(3) The resin composition as described in (2), in which the heavy calcium carbonate has an average particle diameter of 1.0 μm or more and 10.0 μm or less, a BET specific surface area of 0.1 m²/g or more and 10.0 m²/g or less, and a roundness of 0.50 or more and 0.95 or less.

(4) A stretched sheet comprising the resin composition as described in any one of (1) to (3).

(5) The stretched sheet as described in (4), in which whiteness defined in JIS P 8148-2018 is 90% or more.

(6) The stretched sheet as described in (4) or (5), in which opacity defined in JIS P 8149-2000 is 90% or more.

(7) A method for producing a stretched sheet, the method comprising:
  a molding step of molding the resin composition as described in any one of (1) to (3) into a sheet-shaped product, and a stretching step of stretching the sheet-shaped resin composition obtained in the molding step.

(8) The method for producing the stretched sheet as described in (7), further comprising, after the stretching step, a bending treatment step of generating stress acting inside of the stretched sheet by pressing a solid object to a surface of the stretched sheet on the way to transferring the stretched sheet in a conveying direction and setting the stretched sheet to a state where the stretched sheet is folded at a contacting part where the solid object is pressed.

Advantageous Effects of Invention

According to the present invention, the resin composition having the high blending proportion of the inorganic substance powder that can produce the stretched sheet having the excellent elongation property and the high whiteness and opacity is provided.

DESCRIPTION OF EMBODIMENTS

Hereinafter, the embodiments of the present invention will be described in detail. The present invention, however, is not particularly limited to these embodiments.
<Resin Composition>

A resin composition according to the present invention is a resin composition for producing a stretched sheet that satisfies all of the following requirements.

(Requirement 1) A first thermoplastic resin, a second thermoplastic resin different from the first thermoplastic resin, and an inorganic substance powder are included.

(Requirement 2) The mass proportion of the first thermoplastic resin and the inorganic substance powder is 50:50 to 10:90.

(Requirement 3) The content of the second thermoplastic resin is 1% by mass or more and 7% by mass or less relative to the total amount of the first thermoplastic resin and the inorganic substance powder.

(Requirement 4) The second thermoplastic resin is a polypropylene resin satisfying all of (A) to (F) below.

(A) A weight average molecular weight (Mw) is 10,000 or more and 400,000 or less.

(B) A molecular weight distribution (Mw/Mn) is 1.0 or more and 3.0 or less.

(C) A tensile modulus is 1 MPa or more and 600 MPa or less.

(D) 50% by mole or more of a monomer constituting the polypropylene resin is a propylene monomer.

(E) Constituting units of the polypropylene resin satisfy (i) and/or (ii).

(i) A constituting unit of ethylene is included in more than 0% by mole to 20% by mole or less.

(ii) A constituting unit of 1-butene is included in more than 0% by mole to 30% by mole or less.

(F) A melting point (Tm-D) defined by a peak top observed at the highest temperature side of a melting endothermic curve obtained by using a differential scanning calorimeter (DSC), retaining a sample at −10° C. under nitrogen atmosphere for 5 minutes, and thereafter raising a temperature at 10° C./minute is 0° C. or more and 120° C. or less.

The resin composition satisfying (Requirement 2) and having the high blending proportion of the inorganic substance powder provides a stretched sheet having high whiteness and opacity by stretching. At the stretching, however, uneven stretching and reduction in sheet strength may occur and thus there is the possibility that the stretched sheet having excellent elongation property and high whiteness and opacity is difficult to obtain from the resin composition satisfying (Requirement 2).

In contrast, the inventors of the present invention have found that blending of the specified polypropylene resin that satisfies (Requirement 4) in the resin composition in the amount that satisfies (Requirement 3) allows the resin composition that can easily prepare the stretched sheet having excellent elongation property and high whiteness and opacity to be obtained.

The polypropylene resin that satisfies (Requirement 4) is known as an olefinic modifier (a modifier that function as a diffusion agent or the like). As a result of study conducted by the inventors of the present invention, however, the inventors of the present invention have found that a resin composition that can prepare a stretched sheet having excellent elongation property is difficult to obtain even when other olefinic modifiers are blended in place of the polypropylene resin that satisfies (Requirement 4). Therefore, the effect of the present invention achieved by blending (Requirement 4) is quite unexpected.

Examples of the other olefinic modifiers described above include metallocene-catalyzed high melt-tension polypropylenes (for example, "Waymax" (trade name), manufactured by Japan Polypropylene Corporation), low molecular weight polyolefins (for example, "EXCEREX" (trade name), manufactured by Mitsui Chemicals, Inc.), dicyclopentadiene-aromatic compound copolymer-based hydrogenated petroleum resins (for example, "I-MARV" (trade name), manufactured by Idemitsu Showa Shell Sekiyu K. K.), hydroxy group-terminated liquid polyolefins (for example, "EPOL" (trade name), manufactured by Idemitsu Showa Shell Sekiyu K. K.), linear olefins having double bonds at the ends (for example, "LINEALENE" (trade name), manufactured by Idemitsu Showa Shell Sekiyu K. K.), and olefin-based elastomers (for example, "Tafthren" (trade name), manufactured by Sumitomo Chemical Co., Ltd.)

In the present invention, the term "excellent elongation property" means that the value of the elongation of the stretched sheet measured in accordance with the method described in Examples is high (for example, 200% or more).

In the present invention, the term "high whiteness" means that the whiteness of the stretched sheet measured in accordance with JIS P 8148-2018 is high (for example, 90% or more).

In the present invention, the term "high opacity" means that the opacity of the stretched sheet measured in accordance with JIS P 8149-2000 is high (for example, 90% or more).

Hereinafter, the constitution of the resin composition according to the present invention will be described in detail. The polypropylene resin that satisfies (Requirement 4) is also referred to as "low stereoregular polypropylene" below.
(First Thermoplastic Resin)

The first thermoplastic resin is not particularly limited as long as the first thermoplastic resin is different from the second thermoplastic resin (low stereoregular polypropylene). The first thermoplastic resin may be used singly or in combination of two or more of thermoplastic resins.

As the first thermoplastic resin, the following thermoplastic resins may be exemplified:

Polyolefin-based resins such as polyethylene-based resins, polypropylene-based resins (however, resins corresponding to the low stereoregular polypropylene are excluded), polymethyl-1-pentene, and ethylene-cyclic olefin copolymers;

Functional group-containing polyolefin-based resins such as ethylene-vinyl acetate copolymers, ethylene-acrylic acid copolymers, ethylene-methacrylic acid copolymers, metal salts of ethylene-methacrylic acid copolymers (ionomers), ethylene-acrylic acid alkyl ester copolymers, ethylene-methacrylic acid alkyl ester copolymers, maleic acid-modified polyethylene, and maleic acid-modified polypropylene;

Polyamide-based resins such as nylon-6, nylon-6,6, nylon-6,10, and nylon-6,12;

Thermoplastic polyester-based resins such as aromatic polyester-based resins such as polyethylene terephthalate and its copolymers, polyethylene naphthalate, and polybutylene terephthalate, and aliphatic polyester-based resins such as polybutylene succinate and polylactic acid;

Polycarbonate resins such as aromatic polycarbonate and aliphatic polycarbonate;

Polystyrene-based resins such as atactic polystyrene, syndiotactic polystyrene, acrylonitrile-styrene (AS) copolymers, and acrylonitrile-butadiene-styrene (ABS) copolymers;

Polyvinyl chloride-based resins such as polyvinyl chloride and polyvinylidene chloride;

Polyphenylene sulfide; and

Polyether-based resins such as polyethersulfone, Polyether ketone, and polyether ether ketone.

The polyolefin-based resins refer to polyolefin-based resins in which an olefin component unit serves as a main component. Specific examples of the polyolefin-based resins include the polypropylene-based resins and the polyethylene-based resins, in addition, polymethyl-1-pentene and ethylene-cyclic olefin copolymers, as well as mixtures of two or more of these resins.

The term "serves as a main component" means that 50% by mass or more of the olefin component unit is contained in the polyolefin-based resin. The content is preferably 75% by mass or more, more preferably 85% by mass or more, and further preferably 90% by mass or more.

The method for producing the polyolefin-based resin is not particularly limited. The polyolefin-based resin may be obtained by any of the methods using a Ziegler-Natta catalyst, a metallocene catalyst, a radical initiator such as oxygen or a peroxide, and the like.

Examples of the polypropylene-based resin (however, resins corresponding to the low stereoregular polypropylene are excluded.) include resins containing a propylene component unit of 50% by mass or more. Examples of the polypropylene-based resin include propylene homopolymers or copolymers of propylene and other α-olefins copolymerizable with propylene.

Examples of the other α-olefins that can be copolymerized with propylene include α-olefins having a carbon number of 4 to 10 such as ethylene, 1-butene, isobutylene, 1-pentene, 3-methyl-1-butene, 1-hexene, 3,4-dimethyl-1-butene, 1-heptene, and 3-methyl-1-hexene.

As the propylene homopolymers, any of isotactic polypropylene, syndiotactic polypropylene, atactic polypropylene, hemiisotactic polypropylene, and linear or branched polypropylene exhibiting various stereoregularities are included.

The copolymer of propylene and other α-olefins copolymerizable with propylene may be a random copolymer or a block copolymer and may be not only a binary copolymer but also a ternary copolymer.

Specific examples thereof include ethylene-propylene random copolymers, butene-1-propylene random copolymers, ethylene-butene-1-propylene random ternary copolymers, and ethylene-propylene block copolymers.

The content of the α-olefin in the copolymer of propylene and other α-olefin copolymerizable with propylene is preferably in a proportion of 25% by mass or less, more preferably 15% by mass or less, and further preferably 0.3% by mass or less in the case where the mass of the total resin in a resin material is determined to be 100% by mass.

Examples of the polyethylene-based resins include resins having an ethylene component unit of 50% by mass or more. Examples of the polyethylene-based resins include high-density polyethylene (HDPE), low-density polyethylene (LDPE), ultra-low density polyethylene (ULDPE), medium-density polyethylene, linear low-density polyethylene (LLDPE), ethylene-vinyl acetate copolymers, ethylene-propylene copolymers, ethylene-propylene-butene-1 copolymers, ethylene-butene-1 copolymers, ethylene-hexene-1 copolymers, ethylene-4-methylpentene-1 copolymers, and ethylene-octene-1 copolymers.

"High-density polyethylene (HDPE)" refers to polyethylene having a density of 0.942 $g/cm^3$ or more.

"Medium density polyethylene" refers to polyethylene having a density of 0.930 $g/cm^3$ or more and less than 0.942 $g/cm^3$.

"Low-density polyethylene (LDPE)" refers to polyethylene having a density of 0.910 $g/cm^3$ or more and less than 0.930 $g/cm^3$.

"Ultra-low density polyethylene (ULDPE)" refers to Polyethylene having a density of less than 0.910 $g/cm^3$.

"Linear low-density polyethylene (LLDPE)" refers to polyethylene having a density of 0.911 $g/cm^3$ or more and less than 0.940 $g/cm^3$ (preferably 0.912 $g/cm^3$ or more and less than 0.928 $g/cm^3$).

Of the above thermoplastic resins, the polyolefin-based resins are preferable from the viewpoint of ease of molding, performance aspects, economical aspects, and the like of the thermoplastic resins. Of the polyolefin-based resins, the polyethylene-based resins, the polypropylene-based resins (however, resins corresponding to the low stereoregular polypropylene are excluded.), and the mixtures thereof are preferable because these resins have particularly excellent balance between mechanical strength and heat resistance.

(Inorganic Substance Powder)

The inorganic substance powder is not particularly limited and an inorganic substance powder included in common resin products may be used. The inorganic substance powder may be used singly or in combination of two or more of inorganic substance powders.

As the inorganic substance powder, the followings may be exemplified:

Carbonates, sulfates, silicates, phosphates, or borates of metals (calcium, magnesium, aluminum, titanium, iron, zinc, and the like);

Oxides of metals (calcium, magnesium, aluminum, titanium, iron, zinc, and the like); and Hydrates or the like of the above salts or oxides.

Examples of the inorganic substance powder include calcium carbonate, magnesium carbonate, zinc oxide, titanium oxide, silica, alumina, clay, talc, kaolin, aluminum hydroxide, magnesium hydroxide, aluminum silicate, magnesium silicate, calcium silicate, aluminum sulfate, magnesium sulfate, calcium sulfate, magnesium phosphate, barium sulfate, silica sand, carbon black, zeolite, molybdenum, diatomaceous earth, sericite, shirasu, calcium sulfite, sodium sulfate, potassium titanate, bentonite, and graphite.

The inorganic substance powder may be synthetic powder or powder originated from natural minerals.

The shape of the inorganic substance powder is not particularly limited and may be in the form of any of particles (a spheric shape, an irregular shape, or the like), flakes, granules, fibers, and the like. The average particle diameter of the inorganic substance powder is preferably 0.1 µm or more and less than 50.0 µm and more preferably 1.0 µm or more and 10.0 µm or less.

[Heavy Calcium Carbonate]

Heavy calcium carbonate is preferable as the inorganic substance powder from the viewpoint that the effect according to the present invention is easily exhibited. In the present invention, the term "heavy calcium carbonate" means a product produced by mechanically processing (crushing, classifying, and the like) natural calcium carbonate (calcite (for example, limestone and marble), shell, and coral). The heavy calcium carbonate is clearly distinguished from synthetic calcium carbonate produced by chemical precipitation reaction or the like.

Either a wet method or a dry method may be adopted as the method for crushing the heavy calcium carbonate. The dry crashing without the steps such as a dehydration step and a drying step is advantageous from the economical viewpoint. A crusher to be used is not Particularly limited. An impact crusher, a crusher using a crushing medium such as a ball mill, a roller mill, and the like may be used.

As the classification method of the heavy calcium carbonate, air classification, wet cyclone, decanter, and the like may be adopted.

In order to improve dispersibility, reactivity, and the like, any heavy calcium carbonate particles of which surface is surface-treated may be used as the heavy calcium carbonate. From the standpoint of production efficiency, however, the heavy calcium carbonate particles according to the present invention are preferably not subjected to the surface treatment.

As the method for treating the surface of the heavy calcium carbonate particles, physical methods (plasma treatment and the like) and chemical methods (a method using a coupling agent, a surfactant, or the like) may be adopted.

Examples of the coupling agent include silane coupling agents and titanium coupling agents.

Examples of the surfactant include surfactants such as anionic surfactants, cationic surfactants, and nonionic surfactants. For example, higher fatty acids, higher fatty acid esters, higher fatty acid amides, and higher fatty acid salts may be exemplified.

The surface treatment of the heavy calcium carbonate particles can be performed at any point of time (for example, before crushing, during crushing, before classifying, and after classifying). From the viewpoint of easily and effectively obtaining the heavy calcium carbonate particles having a narrow particle diameter distribution, surface treatment is preferably performed before classification.

The number of times of surface treatment is not particularly limited. The surface treatment can be performed at a single step or can be performed by adding a surface treatment agent in two or more times (for example, the surface treatment agent is added as a crushing aid before or during crushing, and thereafter the remaining surface treatment agent is added at a later step).

The average particle diameter of the heavy calcium carbonate is preferably 1.0 µm or more and 10.0 µm or less and more preferably 1.0 µm or more and 3.0 µm or less.

The heavy calcium carbonate particles having an average particle diameter of 1.0 µm or more allow an increase in viscosity when kneaded with the resin to be reduced and thus processability (for example, production of molded products) to tend to be improved.

The heavy calcium carbonate particles having an average particle diameter of 10.0 µm or less allow falling-off of the heavy calcium carbonate particles due to protrusion of the heavy calcium carbonate particles from the surface of the molded product to be avoided and deterioration in the surface properties, mechanical strength, or the like to be avoided, for example, in the case where a sheet-shaped molded product is molded using the resin composition.

In the present invention, the term "average particle diameter" means a value calculated from the measurement result of the specific surface area by an air permeability method in accordance with JIB M-8511. As a measurement apparatus for the specific surface area, for example, a "specific surface area measurement apparatus SS-100" (manufactured by SHIMADZU CORPORATION) may be preferably used.

With respect to the particle diameter distribution of the heavy calcium carbonate, the heavy calcium carbonate preferably excludes particles having a particle diameter of 50.0 µm or more.

The specific surface area (BET specific surface area) of the heavy calcium carbonate particles is preferably 0.1 m²/g or more and 10.0 m²/g or less, more preferably 0.2 m²/g or more and 5.0 m²/g or less, and further preferably 1.0 m²/g or more and 3.0 m²/g or less. The heavy calcium carbonate having a BET specific surface area within this range allows deterioration in process ability of the resin composition to be less likely to occur in the obtained molded product.

In the present invention, the term "BET specific surface area" means a specific surface area identified by a BET adsorption method (nitrogen gas adsorption method). "BEL-SORP-mini" (manufactured by MicrotracBEL Corp.) can be preferably used as a measurement apparatus of the BET specific surface area.

The irregularity of the heavy calcium carbonate particles can be represented by "roundness", which is an indicator of a degree of spheronization of the particle shape. The roundness of the heavy calcium carbonate is preferably 0.50 or more and 0.95 or less, more preferably 0.55 or more and 0.93 or less, and further preferably 0.60 or more and 0.90 or less. The heavy calcium carbonate having a roundness within this range allows the mechanical strength and moldability of molded products obtained from the resin composition to tend to be excellent.

In the present invention, the term "roundness" means a value represented by (Projected area of particle)/(Area of a circle having the same perimeter as the projected perimeter of particle). The method of measuring the roundness is not particularly limited. For example, the roundness can be determined based on a micrograph.

The projected area of the particle and the projected perimeter of the particle are measured from the micrograph and are determined to be (A) and (PM), respectively. When the radius of a circle having the same perimeter as the projected perimeter of the particle is determined to be (r), $$PM = 2\pi r \quad (1).$$

The area of a circle having the same perimeter as the projected perimeter of the particle is determined to (B), $$B = \pi r^2 \quad (2).$$

Transforming Formula (1) results in r=PM/2π (3). Therefore, substituting Formula (3) into Formula (2) results in $$B = \pi \times (PM/2\pi)^2 \qquad (4).$$

Consequently, the roundness is calculated as Roundness=A/B=A×4π/(PM)².

The particles that are measurement target for the roundness are sampled so as to represent the particle distribution of the powder. As the number of the measured particles becomes larger, the reliably of the measured value becomes higher. In consideration of measurement time, the roundness is usually represented as the average of the roundness of about 100 particles.

The roundness can also be calculated with commercially available image analysis software using the projection image of each particle obtained by a scanning microscope, a stereomicroscope, or the like.

(Proportion of First Thermoplastic Resin to Inorganic Substance Powder)

The mass proportion of the thermoplastic resin to the inorganic substance powder is thermoplastic resin:inorganic substance powder=50:50 to 10:90. The mass proportion is preferably 40:60 to 20:80 and more preferably 40:60 to 25:75.

The total amount of the first thermoplastic resin and the inorganic substance powder included in the resin composition according to the present invention is not particularly limited. The total amount is preferably 80.0% by mass or more and 99.0% by mass or less and more preferably 93.0% by mass or more and 99.0% by mass or less relative to the resin composition.

(Second Thermoplastic Resin)

The second thermoplastic resin (low stereoregular polypropylene) is a polypropylene resin satisfying all of (A) to (F) below. As the second thermoplastic resins, the polypropylene resin satisfying all of the followings may be used singly or in combination of two or more of the polypropylene resins.

(A) A weight average molecular weight (Mw) is 10,000 or more and 400,000 or less.
(B) A molecular weight distribution (Mw/Mn) is 1.0 or more and 3.0 or less.
(C) A tensile modulus is 1 MPa or more and 600 MPa or less.
(D) 50% by mole or more of a monomer constituting the polypropylene resin is a propylene monomer.
(E) Constituting units of the polypropylene resin satisfy (i) and/or (ii).
  (i) A constituting unit of ethylene is included in more than 0% by mole to 20% by mole or less.
  (ii) A constituting unit of 1-butene is included in more than 0% by mole to 30% by mole or less.
(F) A melting point (Tm-D) defined by a peak top observed at the highest temperature side of a melting endothermic curve obtained by using a differential scanning calorimeter (DSC), retaining a sample at −10° C. under nitrogen atmosphere for 5 minutes, and thereafter raising a temperature at 10° C./minute is 0° C. or more and 120° C. or less.

With respect to (A), the term "weight average molecular weight (MW)" means a weight average molecular weight value in terms of standard polystyrene measured by gel permeation chromatography (GPC) using chloroform as an eluent.

The weight average molecular weight (MW) is preferably 30,000 or more and 300,000 or less and more preferably 50,000 or more and 200,000 or less.

With respect to (B) the term "molecular weight distribution (Mw/Mn)" means a value obtained by dividing the weight average molecular weight (Mw) by a number average molecular weight (Mn).

The term "number average molecular weight (Mn)" means a number average molecular weight value in terms of standard polystyrene measured by gel permeation chromatography (GPC) using chloroform as the eluent.

The molecular weight distribution (Mw/Mn) is preferably 1.3 or more and 2.8 or less and more preferably 1.5 or more and 2.5 or less.

With respect to (C), the term "tensile modulus" is a value obtained in accordance with JIS K7161.

The tensile modulus is preferably 5 MPa or more and 400 MPa or less and more preferably 10 MPa or more and 200 MPa or less.

With respect to (D), the kind and amount of monomer constituting the polypropylene resin is determined by known methods.

As the amount of the monomers constituting the polypropylene resin, the propylene monomer is preferably included in 60% by mole or more and more preferably included in 70% by mole or more.

With respect to (E), the amounts of the constituting units of ethylene and 1-butene, which are constituting units of the polypropylene resin, are determined in the same method as the method in (D).

The amount of the constituting unit of ethylene is preferably 3% by mole or more and 18% by mole or less and more preferably 5% by mole or more and 15% by mole or less.

The amount of the constituting unit of 1-butene is preferably 3% by mole or more and 28% by mole or less and more preferably 5% by mole or more and 25% by mole or less.

With respect to (F), the melting point (Tm-D) is preferably 40° C. or more and 110° C. or less and more preferably 60° C. or more and 100° C. or less.

The content of the second thermoplastic resin is 1% by mass or more and 7% by mass or less relative to the total amount of the first thermoplastic resin and the inorganic substance powder.

A content of the second thermoplastic resin of 1% by mass or more allows the whiteness and opacity to be easily improved without impairing the elongation property of the stretched sheet obtained from the resin composition.

A content of the second thermoplastic resin of 7% by mass or less allows excellent elongation property to be easily achieved while the whiteness and opacity of the stretched sheet obtained from the resin composition are being improved.

The lower limit of the content of the second thermoplastic resin is preferably 1.5% by mass or more, more preferably 2% by mass or more, and further preferably 3% by mass or more relative to the total amount of the first thermoplastic resin and the inorganic substance powder.

The upper limit of the content of the second thermoplastic resin is preferably 6.5% by mass or less, more preferably 6% by mass or less, and further preferably 5% by mass or less relative to the total amount of the first thermoplastic resin and the inorganic substance powder.

Commercially available products can be used as the second thermoplastic resin. Examples of such commercially available products include "L-MODU S901" (trade name) (manufactured by Idemitsu Kosan Co., Ltd.).

(Other Resins)

The resin composition according to the present invention may include any resins other than the first thermoplastic resin and the second thermoplastic resin, if necessary. From the viewpoint that the effects of the present invention are easily achieved, however, no resins other than the first thermoplastic resin and the second thermoplastic resin to be blended in the resin composition according to the present invention is preferable.

In the case where resins other than the first thermoplastic resin and the second thermoplastic resin are included in the resin composition according to the present invention, the kinds and amounts of such resins can be appropriately selected in a range where the effect of the present invention is not impaired.

(Other Additives)

In the resin composition according to the present invention, any additives that can be commonly blended in resin compositions may be included, if necessary. In the case where such additives are included in the resin composition according to the present invention, the kinds and amounts of such additives can be appropriately selected in ranges where the effects of the present invention are not impaired.

Examples of the additives include plasticizers, fillers (other than the inorganic substance powder), colorants, lubricants, coupling agents, fluidity improvers, dispersing agents, antioxidants, ultraviolet ray absorbers, flame retardants, stabilizers, antistatic agents, and foaming agents. These additives may be used singly or in combination of two or more of these additives.

<Method for Producing Resin Composition According to the Present Invention>

The resin composition according to the present invention is obtained by, for example, melting, kneading, and molding the above components by known methods, if necessary.

Melting, kneading, and molding the resin composition can be performed by any conventionally known methods. For example, the method may be sequentially performed from melting to molding the resin composition or some or all of the steps may be performed in a non-sequential manner. For example, methods using an extrusion molding machine, an injection molding machine, and a press molding machine may be exemplified. Of these methods, the method of using the extrusion molding machine is preferable from the viewpoint of production efficiency.

Examples of the extrusion molding machine include a twin-screw kneading and extruding machine (a co-rotating twin-screw kneading and extruding machine and a counter-rotating twin-screw kneading and extruding machine), a kneader-type extruder, and a single-screw extruder. Of these extrusion molding machines, the kneader-type extruder and the twin-screw kneading and extruding machine are preferable from the viewpoint that moldability becomes excellent due to an easy increase in a melt mass flow rate during the kneading of the resin composition and reduction in variation of the melt mass flow rate.

The form of the resin composition according to the present invention is not particularly limited. The resin composition may be prepared as pellets or may be subjected to molding the stretched sheet as it is without being prepared as pellets. With respect to ease of processing and handling, a preferable form of the resin composition according to the present invention is the pellets.

In this case where the resin molded product according to the present invention is in the form of the pellets, the shape of the pellets is not particularly limited. For example, pellets having a shape of cylinder, sphere, and ellipsoidal sphere may be molded. A pelletizing operation for obtaining the pellets may be performed by procedures or apparatuses commonly used by those skilled in the art. For example, the pellets can be prepared by melting and kneading the components constituting the resin composition using a twin-screw extruder or the like, extruding the kneaded product into a strand shape, cooling the strands, and thereafter pelletizing the cooled strands using a pelletizer. The thus produced pellets can be used for injection molding or the like after the pellets are sufficiently dried to remove moisture.

The size of the pellets may be appropriately determined depending on the shape. For example, in the case of the spherical pellets, the diameter may be 1 mm or more and 10 mm or less. In the case of the ellipsoidal spherical pellets, the pellets may have an elliptical shape with an aspect ratio of 0.1 or more and 1.0 or less and may have longitudinal and lateral lengths of 1 mm or more and 10 mm or less. In the case of the cylindrical pellets, the diameter may be within a range of 1 mm or more and 10 mm or less and the length may be within a range of 1 mm or more and 10 mm or less. These shapes can be molded according to common methods after the kneading step.

<Stretched Sheet>

The resin composition according to the present invention is used for producing the stretched sheet. In the present invention, the term "stretched sheet" means a sheet made by molding the resin composition into a sheet-shaped product and thereafter subjecting the sheet-shaped product to the stretching treatment.

The stretched sheet according to the present invention is a sheet produced by using the resin composition according to the present invention as a material. The stretched sheet according to the present invention includes the resin composition according to the present invention and preferably made of the resin composition according to the present invention.

The stretched sheet according to the present invention is usually prepared as a monolayer sheet and may also be further prepared as a multilayer sheet by laminating any layers (such as a stretched sheet obtained from the resin composition according to the invention, a resin layer, a heat sealing layer, an ink receptive layer, and the like).

The stretched sheet according to the present invention can be used for any application. Specific examples of the application include a sheet for printing, a sheet for packaging, a sheet for vacuum molding, and a sheet for inflation molding.

In the case where the stretched sheet, is the sheet for printing or the sheet for packaging, the thickness after stretching is preferably adjusted to 50 µm or more and 1,000 µm or less and more preferably 50 µm or more and 400 µm or less.

In the case where the stretched sheet is the sheet for vacuum molding, the thickness after stretching is preferably adjusted to 300 µm or more and 2,000 µm or less and more preferably 500 µm or more and 1,000 µm or less.

In the case where the stretched sheet is the sheet for inflation molding, the thickness after stretching is preferably adjusted to 10 µm or more and 200 µm or less and more preferably 30 µm or more and 100 µm or less.

The stretched sheet according to the present invention can be adjusted to high whiteness. The whiteness defined in JIS P 8148-2018 is preferably 90% or more and more preferably 95% or more.

The upper limit of the whiteness is not particularly limited and is usually adjusted to 99% or less.

The stretched sheet according to the present invention can be adjusted to high opacity. The opacity defined in JIS P 8149-2000 is preferably 90% or more and more preferably 95% or more.

The upper limit of opacity is not particularly limited and is usually adjusted to 99% or less.

<Method for Producing Stretched Sheet>

As the method for producing the stretched sheet according to the present invention, any method for molding the sheet can be adopted except that the resin composition according to the present invention must be used as the target to be molded.

As the method for molding the sheet, for example, a method including a molding step of molding the resin composition according to the present invention into a sheet-shaped product and a stretching step of stretching the sheet-shaped resin composition obtained at the molding step may be suitably adopted.

Examples of preferable conditions at the molding step include melting and kneading the resin composition according to the present invention by a twin-screw extruder at 180° C. or more and 250° C. or less and more preferably 180° C. or more and 230° C. or less and thereafter molding the kneaded resin composition into a sheet-shaped product (non-stretched sheet-shaped product) through a T-die.

At the stretching step, any of the uniaxial stretching, biaxial stretching, or multiaxial stretching (such as stretching by a tubular method) can be adopted.

A stretching ratio at the stretching step can be appropriately set depending on the whiteness and opacity to be obtained and is preferably 1.3 or more and 3.0 or less and more preferably 1.5 or more and 2.5 or less. In the present invention, excellent whiteness and opacity can be achieved even when the stretching ratio is not excessive.

After the stretching step, the stretched sheet may further be subjected to a bending treatment step. Specifically, the bending treatment step is a step of generating stress acting inside of a stretched sheet by pressing a solid object to a surface of the stretched sheet on the way to transferring the stretched sheet in a conveying direction and setting the stretched sheet to a state where the stretched sheet is folded at a contacting part where the solid object is pressed. Such a step allows sufficient flexibility and strength to be provided to the stretched sheet.

The bending treatment step may be performed on either one side or both sides of the stretched sheet.

As the solid object used in the bending treatment step, a member in which a length in the longitudinal direction of the solid object is longer than a length in the width direction (CD direction) of the stretched sheet is preferable. Such a member is arranged across the flow direction of the stretched sheet. The cross-sectional shape of the contacting part between the solid object and the stretched sheet is preferably a shape having a corner part with an acute angle to the extent that the stretched sheet does not break or a shape having a round part with a small radius of curvature.

EXAMPLES

Hereinafter, the present invention will be described specifically with reference to Examples. These Examples are described only for the purpose of exemplifying specific aspects and embodiments in order to facilitate the understanding of the concept and scope of the present invention. The present invention, however, is not limited to these Examples in any way.

<Preparation for the Production of Resin Composition>

The materials listed in "Composition" in Tables below were prepared.

In Tables below, the values listed for "First thermoplastic resin" and "Inorganic substance powder" mean the mass proportions of "First thermoplastic resin" and "Inorganic substance powder". For example, in "Example 1-1", the first thermoplastic resin and the inorganic substance powder are used in a mass proportion of "First thermoplastic resin": "Inorganic substance powder"=10:90.

In Tables below, the value listed for "Olefinic modifier" means the blending amount of "Olefinic modifier" (unit: % by mass) relative to the total amount of "First thermoplastic resin" and "Inorganic substance powder".

The following materials were used for the resin compositions.

(First Thermoplastic Resin)

"PP-1": Polypropylene resin (Trade name: "El11G", manufactured by Prime Polymer Co., Ltd.) satisfying all of the following properties.

Tensile modulus: 1,700 MPa
Homopolymer
Melting point: 165° C.

"PE": Polyethylene resin (Trade name "SHC7260", high density polyethylene resin manufactured by Braskem S. A., Density: 0.959, MFR=7.2 g/10 min)

"PP+PE": Resin mixture containing "PP-1" and "PE" in equal proportion.

(Inorganic Substance Powder)

Heavy calcium carbonate particles without surface treatment satisfying all of the followings.

Average particle diameter: 2.2 μm
BET Specific surface area: 1.0 $m^2/g$
Roundness: 0.85

(Olefinic Modifier)

"PP-2": Polypropylene resin (Trade name: "L-MODU S901", manufactured by idemitsu Showa Shell Sekiyu K.K.) satisfying all of the followings.

Weight average molecular weight (Mw): 130000
Molecular weight distribution (Mw/Mn): 2.0
Tensile modulus: 110 MPa.
70% by mole or more of the monomer constituting the polypropylene resin is a propylene monomer.

The constituting units of the polypropylene resin satisfy (i) and/or (ii) below.

(i) The constituting unit of ethylene is contained in 10% by mole.
(ii) The constituting unit of 1-butene is contained in 15% by mole.

The melting point (Tm-D) defined by a peak top observed at the highest temperature side of a melting endothermic curve obtained by using a differential scanning calorimeter (DSC), retaining a sample at −10° C. under nitrogen atmosphere for 5 minutes, and thereafter raising a temperature at 10° C./minute is 80° C.

"PP-3": Metallocene catalyzed high melt-tension polypropylene, trade name "Waymax", manufactured by Japan Polypropylene Corporation.

"PP-4": Low molecular weight polyolefin, trade name "EXCEREX", manufactured by Mitsui Chemicals, Inc.

<Production of Resin Composition>

The materials listed in "Composition" in Tables below are charged into a twin-screw kneading and extruding machine (an extrusion molding apparatus with a T-die (screw diameter 20 mm, L/D=25), manufactured by Toyo Seiki Seisakusho, Ltd.). The martials were kneaded at a temperature of 190° C. and pelletized to obtain the resin composition.

<Production of Stretched Sheet>

Using the obtained resin composition, a stretched sheet was obtained by inciting and kneading the resin composition at 190° C., and thereafter molding the melted and kneaded resin composition into a sheet-shaped product (thickness 1.2 mm) through a T-die. Subsequently, the obtained non-stretched sheet was stretched in a biaxial direction at the stretching ratio listed in Tables to obtain a stretched sheet.

<Evaluation of Stretched Sheet>

With respect to the obtained stretched sheet, whiteness, opacity, and elongation property were evaluated in accordance with the following methods. The results are listed in each sections of "Evaluation" in Tables.

(Whiteness)

The whiteness of each stretched sheet was identified in accordance with JIS P 8148-2018. The stretched sheet having a whiteness of 90% or more allows the whiteness of the stretched sheet to be evaluated to be excellent.

(Opacity)

The opacity of each stretched sheet was identified in accordance with JIS P 8149-2000. The stretched sheet having an opacity of 90% or more allows the opacity of the stretched sheet to be evaluated to be excellent.

(Elongation Property)

A tensile test of the stretched sheet was performed at a temperature of 23° C. using Strograph manufactured by Toyo Seiki Seisaku-sho, Ltd. As the shape of the test specimen, the dumbbell-shaped No. 3 test specimen in accordance with JIS K6251-2017 was used. Stretching speed was set to 200 mm/min and elongation at break (unit: %) was measured.

TABLE 1

|  |  |  | Example 1-1 | Example 1-2 | Example 1-3 | Example 1-4 | Example 1-5 | Example 1-6 | Example 1-7 | Example 1-8 |
|---|---|---|---|---|---|---|---|---|---|---|
| Composition | First thermoplastic resin | PP-1 | 10 | 30 | 50 | 10 | 30 | 50 | 30 | 30 |
|  | Inorganic substance powder |  | 90 | 70 | 50 | 90 | 70 | 50 | 70 | 70 |
|  | Olefinic modifier | PP-2 | 2 | 230 | 2 | 5 | 5 | 5 | 2 | 2 |
| Stretching ratio (times) |  |  | 2 | 2 | 2 | 2 | 2 | 2 | 1 | 4 |
| Evaluation | Whiteness (%) |  | 98 | 97 | 96 | 98 | 97 | 96 | 94 | 98 |
|  | Opacity (%) |  | 97 | 96 | 95 | 97 | 96 | 95 | 93 | 97 |
|  | Elongation property (%) |  | 210 | 230 | 250 | 210 | 230 | 250 | 240 | 200 |

TABLE 2

|  |  |  | Comparative Example 1-1 | Comparative Example 1-2 | Comparative Example 1-3 | Comparative Example 1-4 | Comparative Example 1-5 | Comparative Example 1-6 | Comparative Example 1-7 |
|---|---|---|---|---|---|---|---|---|---|
| Composition | First thermoplastic resin | PP-1 | 10 | 30 | 50 | 10 | 30 | 50 | 5 |
|  | Inorganic substance powder |  | 90 | 70 | 50 | 90 | 70 | 50 | 95 |
|  | Olefinic modifier | PP-2 PP-3 PP-4 | 0.1 | 0.1 | 0.1 | 10 | 10 | 10 | 2 |
| Stretching ratio (times) |  |  | 2 | 2 | 2 | 2 | 2 | 2 | 2 |
| Evaluation | Whiteness (%) |  | 89 | 88 | 87 | 98 | 97 | 96 | 99 |
|  | Opacity (%) |  | 88 | 87 | 86 | 97 | 96 | 95 | 98 |
|  | Elongation property (%) |  | 210 | 230 | 250 | 150 | 160 | 170 | 130 |

|  |  |  | Comparative Example 1-8 | Comparative Example 1-9 | Comparative Example 1-10 | Comparative Example 1-11 | Comparative Example 1-12 |
|---|---|---|---|---|---|---|---|
| Composition | First thermoplastic resin | PP-1 | 80 | 5 | 80 | 30 | 30 |
|  | Inorganic substance powder |  | 20 | 95 | 20 | 70 | 70 |
|  | Olefinic modifier | PP-2 | 2 | 5 | 5 |  |  |
|  |  | PP-3 |  |  |  | 2 |  |
|  |  | PP-4 |  |  |  |  | 2 |
| Stretching ratio (times) |  |  | 2 | 2 | 2 | 2 | 2 |
| Evaluation | Whiteness (%) |  | 76 | 99 | 77 | 93 | 94 |
|  | Opacity (%) |  | 75 | 98 | 76 | 92 | 93 |
|  | Elongation property (%) |  | 270 | 130 | 270 | 170 | 180 |

TABLE 3

| | | | Example 2-1 | Example 2-2 | Example 2-3 | Example 2-4 | Example 2-5 | Example 2-6 | Example 2-7 | Example 2-8 |
|---|---|---|---|---|---|---|---|---|---|---|
| Composition | First thermoplastic resin | PE | 10 | 30 | 50 | 10 | 30 | 50 | 30 | 30 |
| | Inorganic substance powder | | 90 | 70 | 50 | 90 | 70 | 50 | 70 | 70 |
| | Olefinic modifier | PP-2 | 2 | 2 | 2 | 5 | 5 | 5 | 2 | 2 |
| Stretching ratio (times) | | | 2 | 2 | 2 | 2 | 2 | 2 | 1 | 4 |
| Evaluation | Whiteness (%) | | 98 | 97 | 96 | 98 | 97 | 96 | 94 | 98 |
| | Opacity (%) | | 97 | 96 | 95 | 97 | 96 | 95 | 93 | 97 |
| | Elongation property (%) | | 250 | 270 | 290 | 250 | 270 | 290 | 280 | 200 |

TABLE 4

| | | | Comparative Example 2-1 | Comparative Example 2-2 | Comparative Example 2-3 | Comparative Example 2-4 | Comparative Example 2-5 | Comparative Example 2-6 | Comparative Example 2-7 |
|---|---|---|---|---|---|---|---|---|---|
| Composition | First thermoplastic resin | PE | 10 | 30 | 50 | 10 | 30 | 50 | 5 |
| | Inorganic substance powder | | 90 | 70 | 50 | 90 | 70 | 50 | 95 |
| | Olefinic modifier | PP-2 | 0.1 | 0.1 | 0.1 | 10 | 10 | 10 | 2 |
| | | PP-3 | | | | | | | |
| | | PP-4 | | | | | | | |
| Stretching ratio (times) | | | 2 | 2 | 2 | 2 | 2 | 2 | 2 |
| Evaluation | Whiteness (%) | | 89 | 88 | 87 | 98 | 97 | 96 | 99 |
| | Opacity (%) | | 88 | 87 | 86 | 97 | 96 | 95 | 98 |
| | Elongation property (%) | | 250 | 270 | 290 | 170 | 180 | 190 | 130 |

| | | | Comparative Example 2-8 | Comparative Example 2-9 | Comparative Example 2-10 | Comparative Example 2-11 | Comparative Example 2-12 |
|---|---|---|---|---|---|---|---|
| Composition | First thermoplastic resin | PE | 80 | 5 | 80 | 30 | 30 |
| | Inorganic substance powder | | 20 | 95 | 20 | 70 | 70 |
| | Olefinic modifier | PP-2 | 2 | 5 | 5 | | |
| | | PP-3 | | | | 2 | |
| | | PP-4 | | | | | 2 |
| Stretching ratio (times) | | | 2 | 2 | 2 | 2 | 2 |
| Evaluation | Whiteness (%) | | 76 | 99 | 77 | 93 | 94 |
| | Opacity (%) | | 75 | 98 | 76 | 92 | 93 |
| | Elongation property (%) | | 280 | 130 | 280 | 170 | 180 |

TABLE 5

| | | | Example 3-1 | Example 3-2 | Example 3-3 | Example 3-4 | Example 3-5 | Example 3-6 | Example 3-7 | Example 3-8 |
|---|---|---|---|---|---|---|---|---|---|---|
| Composition | First thermoplastic resin | PP + PE | 10 | 30 | 50 | 10 | 30 | 50 | 30 | 30 |
| | Inorganic substance powder | | 90 | 70 | 50 | 90 | 70 | 50 | 70 | 70 |
| | Olefinic modifier | PP-2 | 2 | 2 | 2 | 5 | 5 | 5 | 2 | 2 |
| Stretching ratio (times) | | | 2 | 2 | 2 | 2 | 2 | 2 | 1 | 4 |
| Evaluation | Whiteness (%) | | 98 | 97 | 96 | 98 | 97 | 96 | 94 | 98 |
| | Opacity (%) | | 97 | 96 | 95 | 97 | 96 | 95 | 93 | 97 |
| | Elongation property (%) | | 230 | 250 | 270 | 230 | 250 | 270 | 260 | 200 |

TABLE 6

|  |  |  | Comparative Example 3-1 | Comparative Example 3-2 | Comparative Example 3-3 | Comparative Example 3-4 | Comparative Example 3-5 | Comparative Example 3-6 | Comparative Example 3-7 |
|---|---|---|---|---|---|---|---|---|---|
| Composition | First thermoplastic resin | PP + PE | 10 | 30 | 50 | 10 | 30 | 50 | 5 |
|  | Inorganic substance powder |  | 90 | 70 | 50 | 90 | 70 | 50 | 95 |
|  | Olefinic modifier | PP-2 | 0.1 | 0.1 | 0.1 | 10 | 10 | 10 | 2 |
|  |  | PP-3 |  |  |  |  |  |  |  |
|  |  | PP-4 |  |  |  |  |  |  |  |
| Stretching ratio (times) |  |  | 2 | 2 | 2 | 2 | 2 | 2 | 2 |
| Evaluation | Whiteness (%) |  | 89 | 88 | 87 | 98 | 97 | 96 | 99 |
|  | Opacity (%) |  | 88 | 87 | 86 | 97 | 96 | 95 | 98 |
|  | Elongation property (%) |  | 230 | 250 | 270 | 170 | 175 | 180 | 130 |

|  |  |  | Comparative Example 3-8 | Comparative Example 3-9 | Comparative Example 3-10 | Comparative Example 3-11 | Comparative Example 3-12 |
|---|---|---|---|---|---|---|---|
| Composition | First thermoplastic resin | PP + PE | 80 | 5 | 80 | 30 | 30 |
|  | Inorganic substance powder |  | 20 | 95 | 20 | 70 | 70 |
|  | Olefinic modifier | PP-2 | 2 | 5 | 5 |  |  |
|  |  | PP-3 |  |  |  | 2 |  |
|  |  | PP-4 |  |  |  |  | 2 |
| Stretching ratio (times) |  |  | 2 | 2 | 2 | 2 | 2 |
| Evaluation | Whiteness (%) |  | 76 | 99 | 77 | 93 | 94 |
|  | Opacity (%) |  | 75 | 98 | 76 | 92 | 93 |
|  | Elongation property (%) |  | 275 | 130 | 275 | 170 | 180 |

As listed in Examples, the stretched sheets in which the second thermoplastic resin (low stereoregular polypropylene resin) was blended in the amount specified in the present invention had both excellent whiteness and opacity and excellent elongation property.

The stretched sheet having a stretching ratio of 2 times particularly provided the excellent whiteness and opacity and the excellent elongation property.

In contrast, as listed in Comparative Examples, in the case where the amount of the second thermoplastic resin was smaller than the amount specified in the present invention, the stretched sheet was transparent and excellent whiteness and opacity were difficult to achieve.

As listed in Comparative Examples, in the case where the amount of the second thermoplastic resin was larger than the amount specified in the present invention, the elongation property of the stretched sheet was easily impaired.

As listed in Comparative Examples, in the case where the mass proportion of the first thermoplastic resin to the inorganic substance powder (heavy calcium carbonate) did not satisfy the proportion in the present invention and the proportion of the first thermoplastic resin was low, the elongation property of the stretched sheet was easily impaired.

As listed in Comparative Examples, in the case where the mass proportion of the first thermoplastic resin to the inorganic substance powder (heavy calcium carbonate) did not satisfy the proportion in the present invention and the proportion of the first thermoplastic resin was high, the stretched sheet was transparent and excellent whiteness and opacity were difficult to achieve.

Blending of PP-3 or PP-4, which are known as the olefinic modifiers similarly to the low-stereoregular polypropylene resin, in place of the low stereoregular polypropylene resin caused the elongation property of the stretched sheet to be easily impaired.

The invention claimed is:

1. A resin composition for producing a stretched s the resin composition comprising:
    a resin component consisting of a first thermoplastic resin and a second thermoplastic resin different from the first thermoplastic resin, and
    an inorganic substance powder, wherein
    a mass proportion of the first thermoplastic resin and the inorganic substance powder is 50:50 to 10:90,
    a content of the second thermoplastic resin is 1% by mass or more and 7% by mass or less relative to a total amount of the first thermoplastic resin and the inorganic substance powder,
    the first thermoplastic resin is a polyolefin-based resin, and
    the second thermoplastic resin is a polypropylene resin satisfying all of (A) to (F) below:
(A) a weight average molecular weight (Mw) is from 10,000 to 400,000;
(B) a molecular weight distribution (Mw/Mn) is from 1.0 to 3.0;
(C) a tensile modulus is from 1 MPa to 600 MPa;
(D) 50% by mole or more of a monomer constituting the polypropylene resin is a propylene monomer;
(E) constituting units of the polypropylene resin satisfy (i) and/or (ii):
    (i) a constituting unit of ethylene is present in an amount of up to 20% by mole; and
    (ii) a constituting unit of 1-butene is present in an amount of up to 30% by mole; and
(F) a melting point (Tm-D) defined by a peak top observed at a highest temperature side of a melting endothermic curve obtained by using a differential scanning calorimeter (DSC), retaining a sample at −10° C. under nitrogen atmosphere for 5 minutes, and thereafter raising a temperature at 10° C./minute is from 0° C. to 120° C.

2. The resin composition according to claim 1, wherein the inorganic substance powder is a heavy calcium carbonate without surface treatment.

3. The resin composition according to claim 2, wherein the heavy calcium carbonate has an average particle diameter of from 1.0 μm to 10.0 μm,
a BET specific surface area of from 0.1 m²/g to 10.0 m²/g, and
a roundness of from 0.50 to 0.95.

4. A stretched sheet comprising the resin composition according to claim 1.

5. The stretched sheet according to claim 4, wherein whiteness defined in JIS P 8148-2018 is 90% or more.

6. The stretched sheet according to claim 4, wherein opacity defined in JIS P 8149-2000 is 90% or more.

7. A method for producing a stretched sheet, the method comprising:
a molding step of molding the resin composition according to claim 1 into a sheet-shaped product, and
a stretching step of stretching the sheet-shaped product obtained in the molding step.

8. The method for producing a stretched sheet according to claim 7, further comprising, after the stretching step, a bending treatment step of generating stress acting inside of the stretched sheet by pressing a solid object to a surface of the stretched sheet on a way to transferring the stretched sheet in a conveying direction and setting the stretched sheet to a state where the stretched sheet is folded at a contacting part where the solid object is pressed.

* * * * *